(12) United States Patent
Urokohara

(10) Patent No.: US 6,907,382 B2
(45) Date of Patent: Jun. 14, 2005

(54) EVALUATION DEVICE, EVALUATION METHOD AND PROGRAM

(75) Inventor: Haruhiko Urokohara, Tokyo (JP)

(73) Assignees: NOVAS Inc., Tokyo (JP); U'eyes novas Inc., Tokyo (JP)

( * ) Notice: Subject to any disclaimer, the term of this patent is extended or adjusted under 35 U.S.C. 154(b) by 0 days.

(21) Appl. No.: 10/812,744

(22) Filed: Mar. 30, 2004

(65) Prior Publication Data

US 2004/0181366 A1 Sep. 16, 2004

Related U.S. Application Data

(63) Continuation of application No. PCT/JP02/10141, filed on Sep. 30, 2002.

(30) Foreign Application Priority Data

Oct. 1, 2001 (JP) ........................................ 2001-305681

(51) Int. Cl.[7] ............................ G06F 11/30; G06F 15/00
(52) U.S. Cl. ........................ 702/182; 702/188; 382/103
(58) Field of Search ......................... 700/14, 108, 117; 382/103, 107; 705/7; 345/705; 702/176, 177, 179, 182, 187–189; 434/238

(56) References Cited

U.S. PATENT DOCUMENTS

| | | | | |
|---|---|---|---|---|
| 5,724,262 A | * | 3/1998 | Ghahramani | 702/186 |
| 5,880,723 A | * | 3/1999 | Driskell | 345/866 |
| 6,064,381 A | * | 5/2000 | Harel | 345/705 |
| 6,402,520 B1 | * | 6/2002 | Freer | 434/236 |

FOREIGN PATENT DOCUMENTS

| | | | | |
|---|---|---|---|---|
| JP | 05-197492 | | 8/1993 | |
| JP | 08-029209 | * | 2/1996 | G01D/21/00 |
| JP | 08-036510 | | 2/1996 | |
| JP | 08-101737 | | 4/1996 | |
| JP | 08-153022 | | 6/1996 | |
| JP | 08-161197 | | 6/1996 | |
| JP | 2000-232595 | | 8/2000 | |
| JP | 2001-056771 | | 2/2001 | |
| JP | 2001-213244 | | 8/2001 | |
| JP | 2001-216069 | | 8/2001 | |

OTHER PUBLICATIONS

Copy of International Search Report for PCT Application No. PCT/JP02/10141, Filed Sep. 30, 2002, Date Completed Dec. 27, 2002, Date Mailed Jan. 21, 2003.

Kurosu et al; An Operation Evaluation Model for the Complex Task Situation—DTM –; Information Processing Society of Japan Kenkyu Houkoku; Sep. 17, 1993; pp. 33–40; vol. 93, No. 80; Japan.

* cited by examiner

Primary Examiner—Marc S. Hoff
Assistant Examiner—Paul L Kim
(74) Attorney, Agent, or Firm—Alston & Bird LLP

(57) ABSTRACT

An evaluation device for evaluating the operability of an object device based on the operation of the object device by an examinee, comprising a means of defining the initial status of the above object device, a means of defining a target status after the operation of the object device, an operation identifying means for identifying the operation by the examinee of the object device, a status identifying means for identifying the operation status of the object device by the above operation, a means for judging whether or not the above operation status agrees with a target status, and a clock means for measuring elapsed time required for the above operation status to migrate from an initial status to a target status.

16 Claims, 13 Drawing Sheets

FIG. 6

FILE(F) USER DEFINITION INPUT (1)

LIST OF EXAMINEES

| LOG ID | ID | NAME | READING | NE | DISTINCTION OF SEX | AGE | ADDRESS | TELEPHONE |
|---|---|---|---|---|---|---|---|---|
| 01 | NO.1 | EXAMINEE 1 | EXAMINEE 1 | N | MALE | 35 | IZUMI-CYO, SHIBUYA-KU, TOKYO | |

CREATION OF NEW EXAMINEE INFORMATION

| LOG ID | | |
|---|---|---|
| ID | NO.1 | |
| NAME | EXAMINEE 1 | |
| READING | EXAMINEE 1 | |
| N E | ⦿ N (NOVICE)  ○ E (EXPERT) | ○ UNKNOWN |
| DISTINCTION OF SEX | ⦿ MALE  ○ FEMALE | ○ UNKNOWN |
| AGE | 35 | |
| ADDRESS | IZUMI-CYO, SHIBUYA-KU, TOKYO | |
| TELEPHONE | | |

(1) CLICK → ADDITION OF ENTRY (2) CLICK HERE → INPUT ENTRY NAME: JOB (3) CLICK → OK / CANCEL

FIG. 8

| | STEP | CODE | KEY NAME | ACQUISITION TIME | TEMPERATURE | AUDIO | CD TRACK |
|---|---|---|---|---|---|---|---|
| | 00000 | | | | | | |
| | 00001 | Q | START KEY | 11:00:00.00 | 18 | AM/FM | 1 |
| | 00001 | Q | TEMPERATURE | 11:00:00.07 | 18 | AM/FM | 1 |
| | 00001 | Q | TEMPERATURE | 11:00:00.13 | 18.5 | AM/FM | 1 |
| | 00001 | Q | TEMPERATURE | 11:00:00.63 | 19 | AM/FM | 1 |
| | 00001 | Q | TEMPERATURE | 11:00:00.67 | 19.5 | AM/FM | 1 |
| | 00001 | Q | TEMPERATURE | 11:00:01.02 | 20 | AM/FM | 1 |
| | 00001 | Q | TEMPERATURE | 11:00:01.07 | 20.5 | AM/FM | 1 |
| | 00001 | Q | TEMPERATURE | 11:00:01.10 | 21 | AM/FM | 1 |
| | 00001 | Q | TEMPERATURE | 11:00:01.17 | 21.5 | AM/FM | 1 |
| | 00001 | Q | TEMPERATURE | 11:00:01.40 | 22 | AM/FM | 1 |
| | 00001 | Q | TEMPERATURE | 11:00:01.47 | 22.5 | AM/FM | 1 |
| | 00001 | Q | TEMPERATURE | 11:00:02.17 | 23 | AM/FM | 1 |
| | 00001 | Q | TEMPERATURE | 11:00:02.20 | 23.5 | AM/FM | 1 |
| | 00001 | Q | TEMPERATURE | 11:00:02.40 | 24 | AM/FM | 1 |
| | 00001 | Q | TEMPERATURE | 11:00:02.47 | 24.5 | AM/FM | 1 |
| | 00001 | Q | TEMPERATURE | | 25 | AM/FM | 1 |
| | 00002 | W | CD RACK | 11:00:31.06 | 24 | CD/MD | 2 |
| | 00002 | W | CD RACK | 11:00:03.26 | 24 | CD/MD | 3 |
| | 00003 | | START KEY | 11:00:05.20 | 24 | CD/MD | 3 |

FILE(F) EDIT(E) WINDOW(W)
(1) TEST MACHINE  C-1
    TEST TEST C-1 FOR AIR-CONDITIONER
    EXAMINEE  EXAMINEE 1
(2) CORRECTNESS JUDGING TIME  [0▼].[0▼] SEC

EVALUATION DEVICE, EVALUATION METHOD AND PROGRAM

This is a continuation of Application PCT/JP02/10141, filed on Sep. 30, 2002, currently pending.

BACKGROUND OF THE INVENTION

1. Technical Field

The present invention relates to a technology of evaluating usability of a device.

2. Background Arts

A usability evaluation device and a method thereof, which are disclosed, e.g., in Japanese Patent Application Laid-Open Publication No. 2001-56771 already proposed by the present applicant, are know as this type of technology. This usability evaluation device evaluates usability of an object device by evaluating time till a user attains a target action in an object device such as ATM (Automatic Teller Machine), a ticket issuing/selling machine or a cellular phone, etc.

These object devices are structured to accomplish one object by performing, as their functions, a series of operations such as drawing cash, depositing the cash, purchasing a ticket, giving a phone call, receiving the phone call and so forth. Therefore, the usability evaluation device finally accomplished by sequentially measuring the time till each of the operations is completed.

Depending on the object device, however, the completion of the operation can not necessarily be judged distinctively. Namely, the object device of which the operation continuously proceeds, might have a case of being unable to distinctively identify the completion of the operation. Further, depending on an operation tool, there might be case where the completion of the operation can not necessarily be recognized distinctively.

For example, in the case of setting a temperature, time, a volume, tuning in on TV and radio, etc., by use of an up/down switch, there might be often an excess over a target position. This is a case in which if the temperature is desired to be set at 25 degrees, the temperature is changed up further to 26 degrees from 24 degrees and 25 degrees. In this case, after the target setting has been temporarily done, the setting further deviates. The prior arts did not have any contrivance about judging the case given above.

Moreover, if the object device to be evaluated includes a wide variety of operating components, the evaluation based on operations other than the operation upon a detection object can not be made simply by detecting only completion of a series of operations.

Moreover, according to the technology disclosed in the above Publication, the usability of the object device is evaluated by obtaining a ratio of operation time of a well-experienced user who operates the object device to operation time of a general user. Therefore, if the general user has a variety of attributes, those attributes can not be reflected in the evaluation of the object device.

SUMMARY OF THE INVENTION

The present invention was devised in view of the problems inherent in the prior arts described above. Namely, it is an object of the present invention to provide a technology capable of objectively evaluating usability of a device including a variety of operating components.

It is another object of the present invention to provide a technology capable of reflecting a variety of user's attributes in the evaluation of the device.

The present invention adopts the following means in order to accomplish the above objects. Namely, the present invention is an evaluation device for evaluating usability of an object device on the basis of an operation by an examinee upon the object device, comprising means for defining an initial status of the object device, means for defining a target status after operating the object device, operation identifying means for identifying an examinee's operation upon the object device, status identifying means for identifying an operation status of the object device by the examinee's operation, judging means for judging whether the operation status is coincident with the target status or not, and time measuring means for measuring elapsed time till the operation status reaches the target status from the initial status.

Thus, according to the present invention, the operation status of the object device based on the examinee's operation is compared with the target status, and the time till the operations status reaches the target status is measured. Therefore, the usability of the object device is judged based on the time. On this occasion, an unnecessary operation other than the operation for reaching the target status is analyzed, and this analysis can be reflected in evaluation the object device. Further, the means for defining the target status defines the target status without any restriction, and the object device can be evaluated in a variety of procedures.

Preferably, the target status may contain a plurality of transition statuses, the judging means may sequentially judge whether the operation status is coincident with each of the plurality of transition statuses, and the time measuring means may measure each elapsed time till each of the transition status is reached.

As described above, according to the present invention, the object device can be evaluated based on the elapsed time in each step till the target status is finally reached through transitions of the plurality of transition statuses.

Preferably, the operation identifying means may include a detection unit for detecting the operation upon the object device, and a notifying unit for notifying of the detected operation.

Preferably, the operation identifying means may include means for receiving a signal generated corresponding to the operation upon the object device, and the status identifying means may identify the operation status by referring to a signal definition part in which a change in the status of the object device that corresponds to the signal is defined.

Preferably, the evaluation device may further comprise means for referring to time when receiving the signal, and means for recording the time when receiving the signal together with the operation status identified by the received signal. Thus, when receiving the signal, the operation status of the device may be identified and recorded.

Preferably, the operation identifying means may include means for reading a recording part recorded with the signal generated corresponding to the operation upon the object device and with generation time of this signal, the status identifying means may identify the operation status by referring to the signal definition part in which the change in the status of the object device that corresponds to the signal is defined, and the time measuring means may include means for calculating the elapsed time on the basis of the generation time read from the recording part. As explained above, at first, the type of the generated signal and the generation time are recorded, and the status of the device may separately be identified.

Preferably, the judging means may judge that the operation status is coincident with the target status when the operation status is continuously in the target status during a predetermined period. Thus, according to the present invention, if the coincident status continues during the predetermined period, this is judged to be coincident. Hence, if the examinee's operation exceeds a target value, it is possible to prevent a misjudgment that the target value has been set.

Preferably, the evaluation device may further comprise means for registering attributes of the examinee operating the object device, means for adding up the elapsed time for every attribute of the examinee, and means for calculating a ratio of an added-up result about examinees having a first attribute to an added-up result about examinees having a second attribute.

Thus, according to the present invention, the measurement results when the individual examinees operate the object device can be classified and added up in accordance with the attributes of the examinees. This contrivance enables the evaluation to contain a relationship between the attributes of the examinee and the usability of the device.

Further, the present invention may also be a method by which any one of the functions described above is actualized. Moreover, the present invention may also be a program for making a computer actualize any one of the aforementioned functions. Still further, the present invention may be a readable-by-computer recording medium recorded with such a program.

Herein, the readable-by-computer recording medium connotes recording mediums capable of storing information such as data, programs, etc. electrically, magnetically, optically and mechanically or by chemical action, which can be read by the computer. What is demountable out of the computer among those recording mediums may be, e.g., a flexible disk, a magneto-optic disk, a CD-ROM, a CD-R/W, a DVD, a DAT, an 8 mm tape, a memory card, etc.

Further, a hard disk, a ROM (Read Only Memory) and so on are given as recording mediums fixed into the computer.

As explained above, according to the present invention, the usability of the device including the variety of operating components can be objectively evaluated. Furthermore, according to the present invention, the variety of attributes of the user can be reflected in the evaluation of the device.

BRIEF DESCRIPTION OF THE DRAWINGS

FIG. 6 shows an example of the examinee information definition screen;

FIG. 8 shows an example of a log data display screen;

DETAILED DESCRIPTION OF THE PREFERRED EMBODIMENT

A usability evaluation device according to a preferred embodiment of the present invention will hereinafter be described with reference to the drawings in FIGS. 1 through 13.

Figure 1:
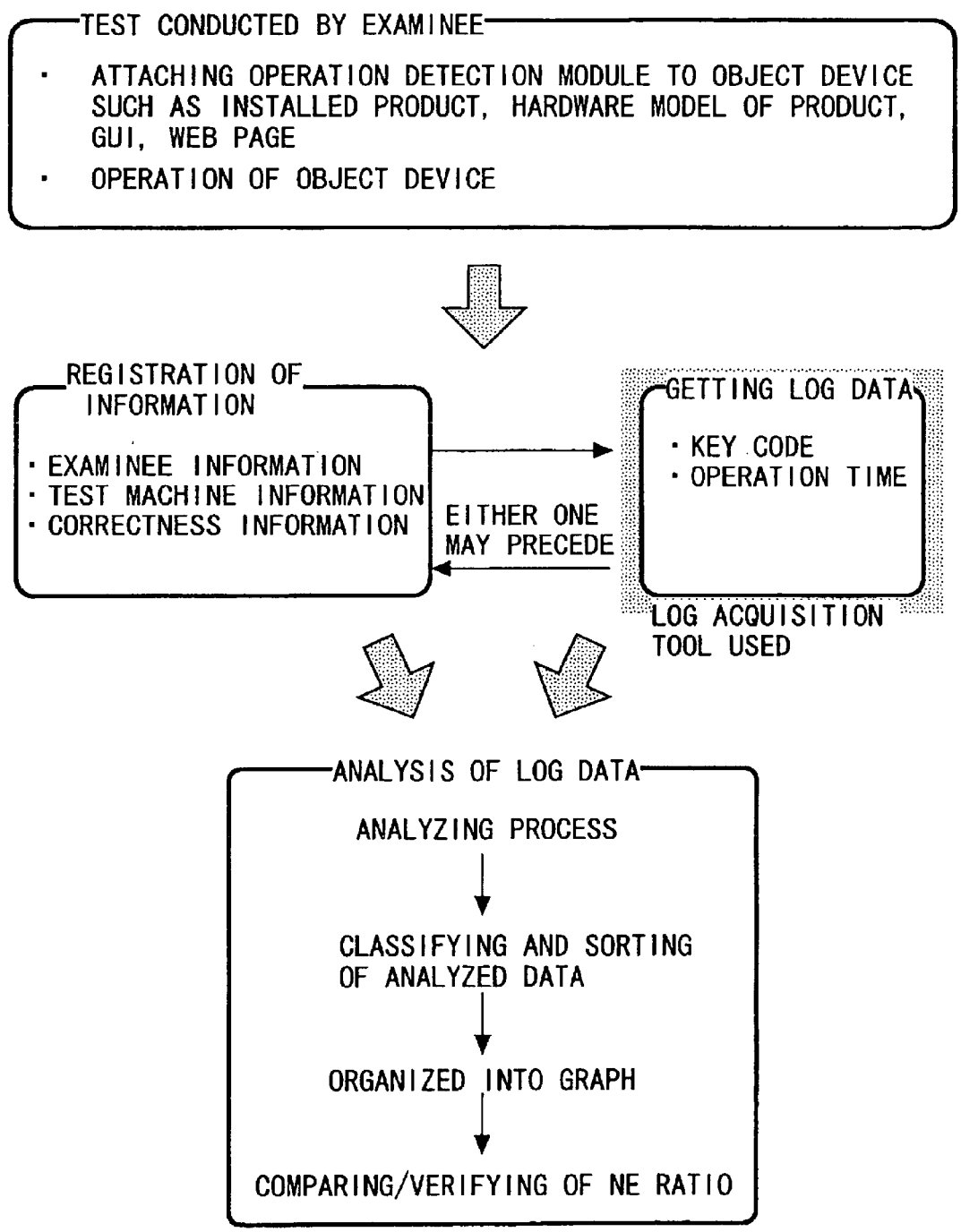
FIG. 1 is a conceptual diagram of a usability evaluation device in one embodiment of the present invention.
Figure 2:
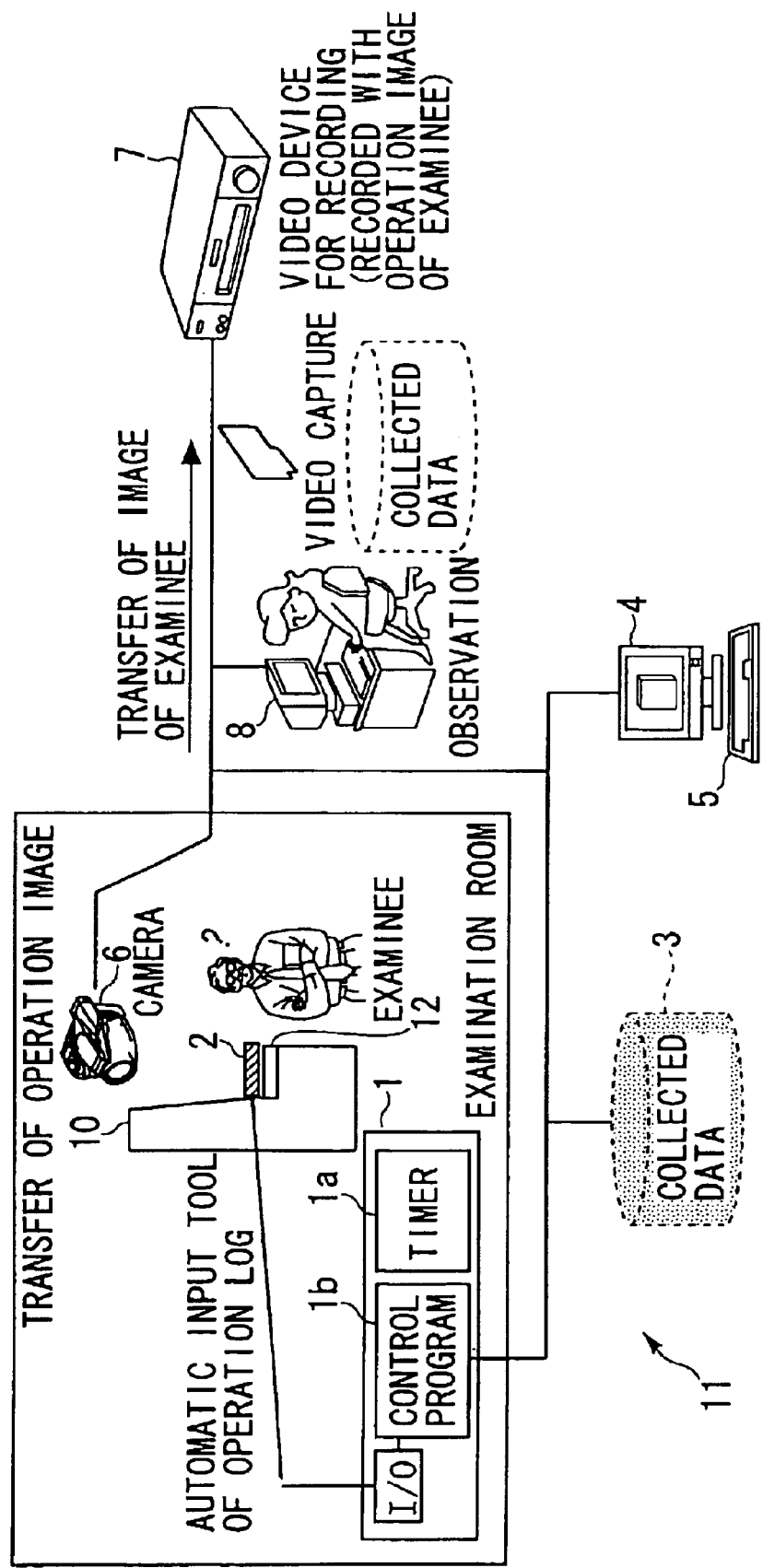
FIG. 2 is a view of a system structure of the usability evaluation device.
Figure 9:
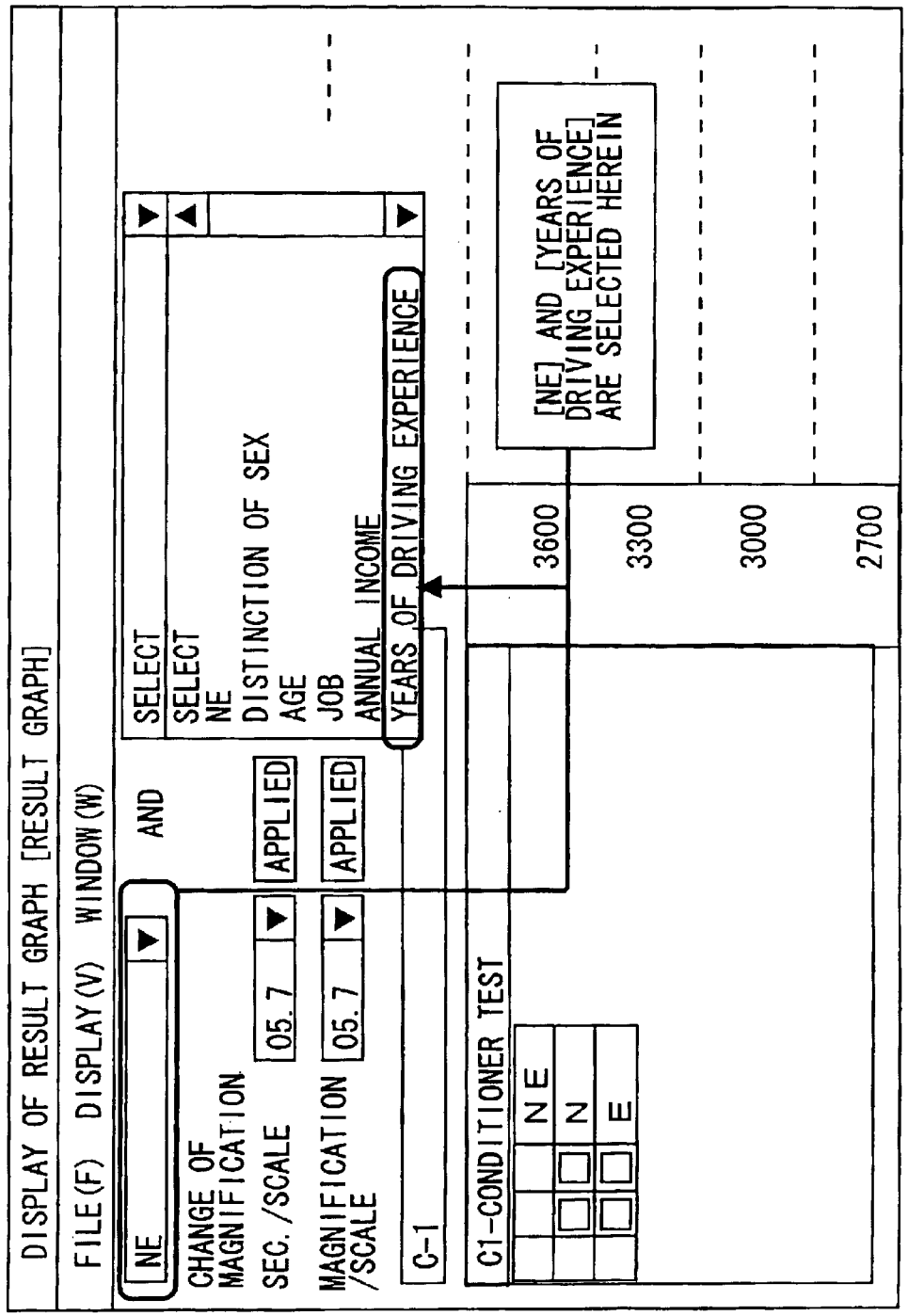
FIG. 9 shows an example of a comparison and verification based on an attribute ratio between the examinees.
Figure 10:
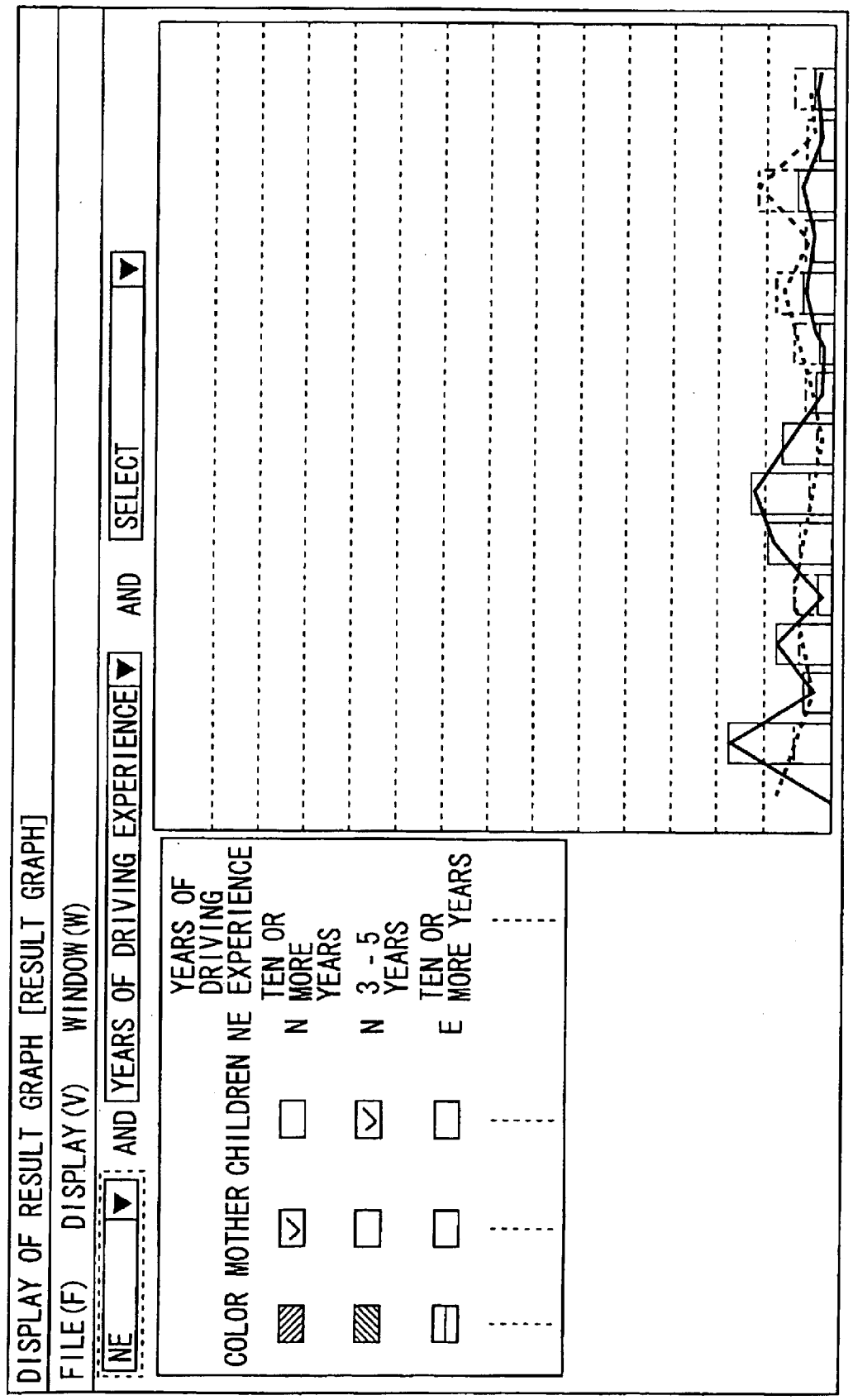
FIG. 10 shows an example of the comparison and the verification based on the attribute ratio between the examinees.
Figure 11:
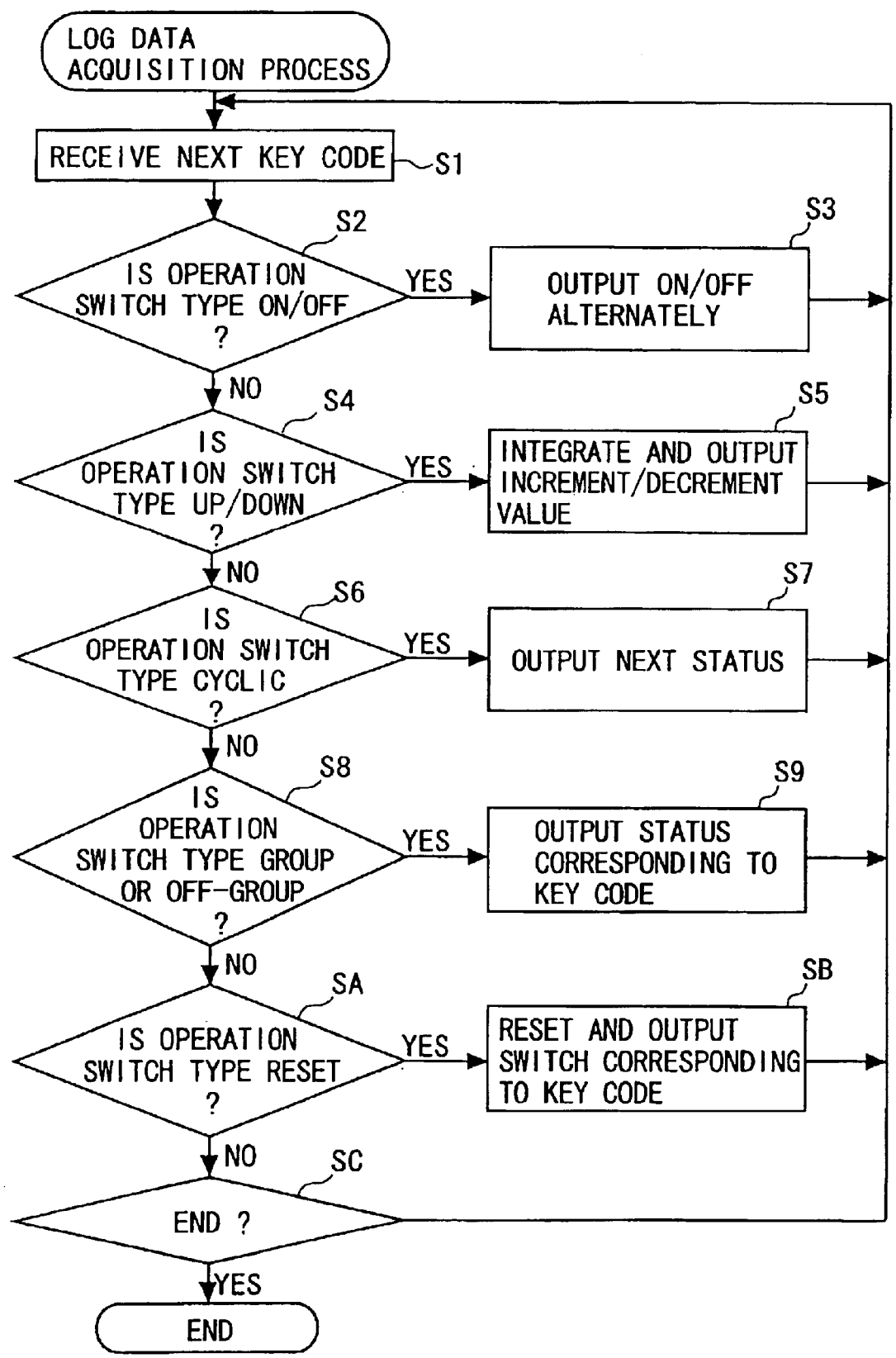
FIG. 11 is a flowchart showing a log information acquisition process.
Figure 12:
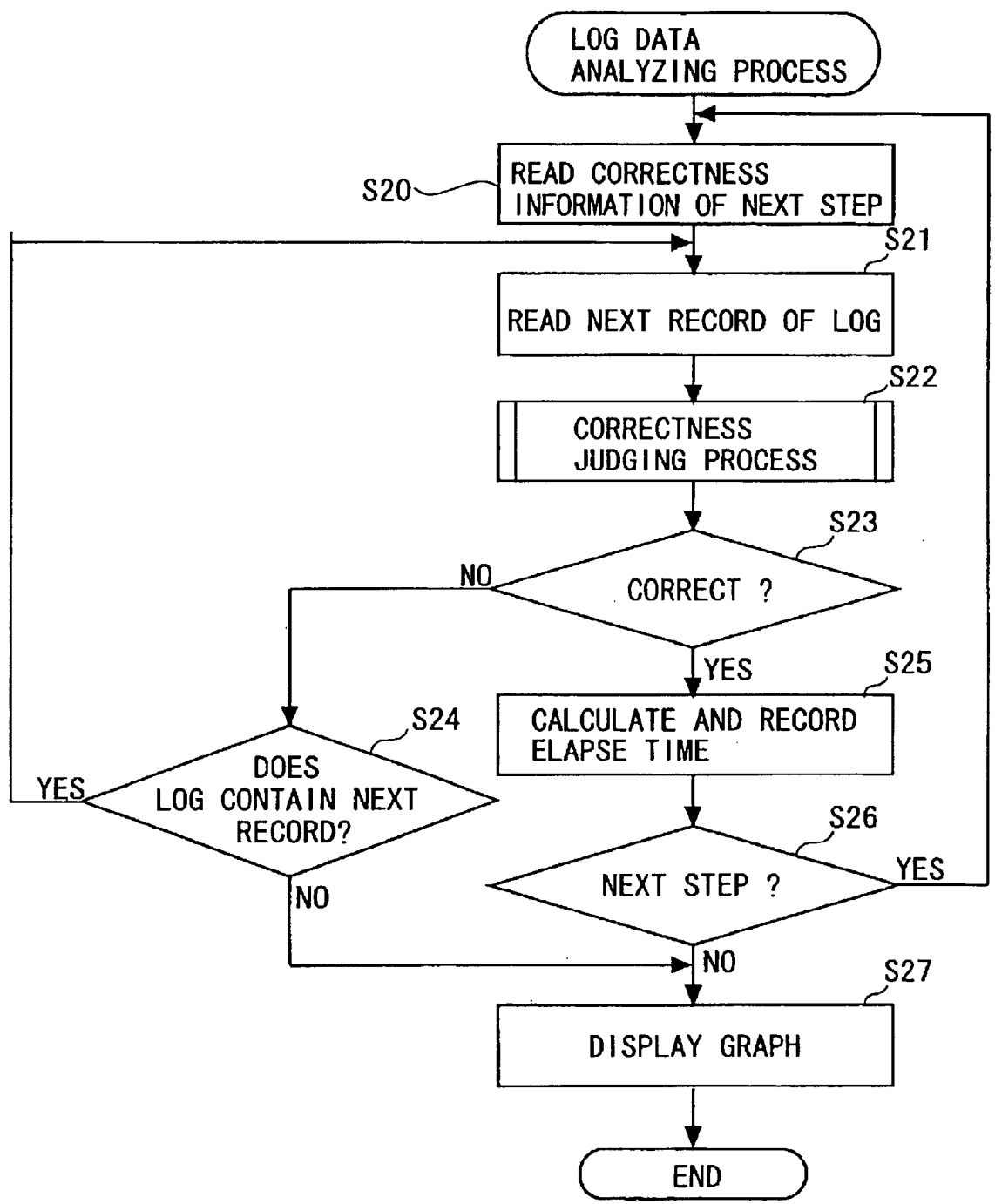
FIG. 12 is a flowchart showing a log data analyzing process.
Figure 13:
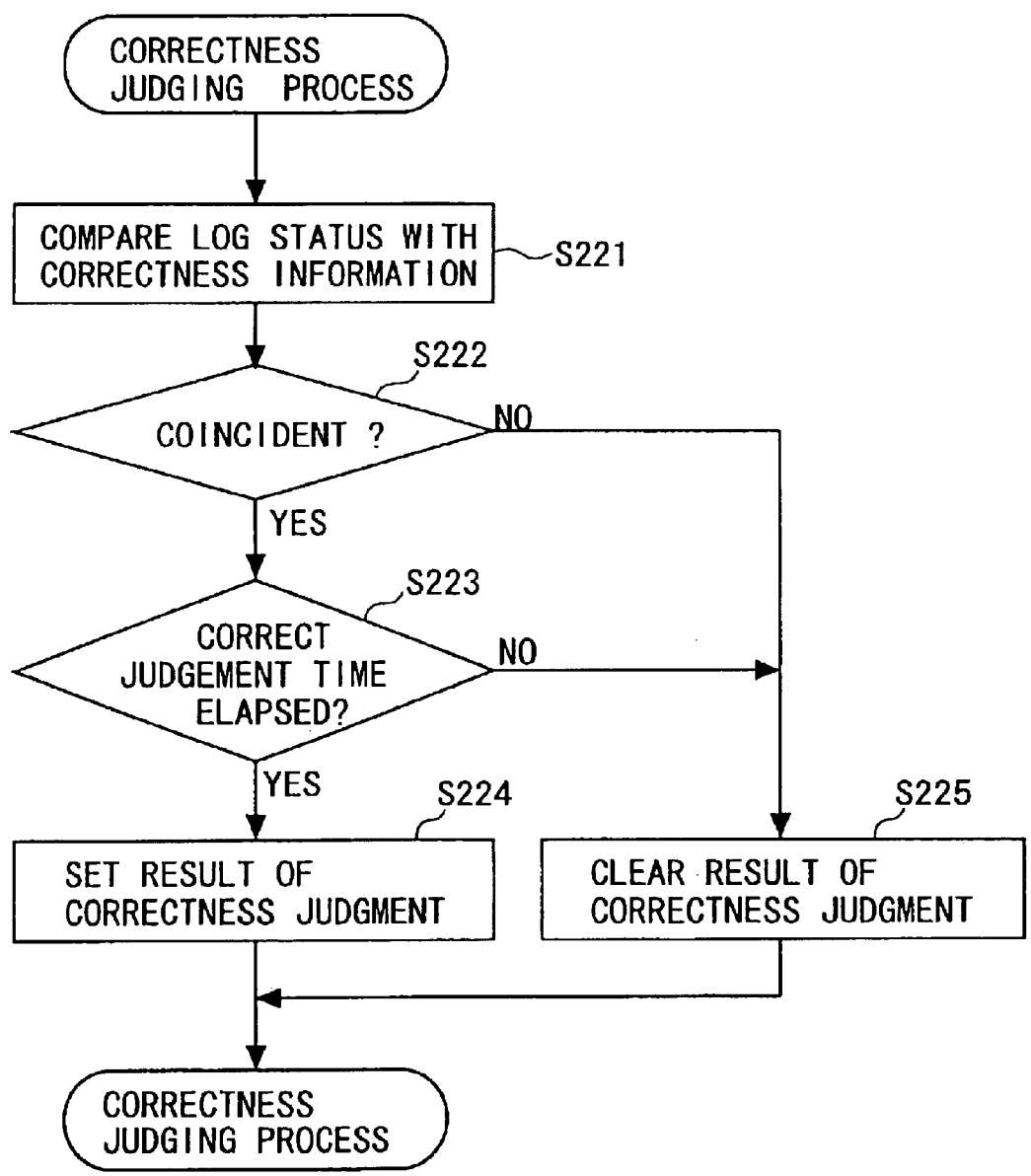
FIG. 13 is a flowchart showing a correctness judging process.

FIG. 1 is a conceptual diagram of the usability evaluation device in the present embodiment. FIG. 2 is a view of a system structure of the usability evaluation device. FIGS. 3 through 7 show examples of a definition screen for defining various categories of information in this usability evaluation device. FIG. 8 shows an example of a log data display screen of the usability evaluation device. FIGS. 9 and 10 show screens for a comparing/verifying operation based on attributes of an examinee. FIG. 11 is a flowchart showing a log information acquisition process executed by a CPU 1 in FIG. 2. FIG. 12 is a flowchart showing a log data analyzing process. FIG. 13 is a flowchart showing a correctness judging process.

<Concept of Device>

FIG. 1 shows the conceptual diagram of the present usability evaluation device. The present usability evaluation device is constructed of an operation detecting module for detecting user's (examinee's) operations (events) on a variety of devices and for generating a predetermined key code (a bit-string of 1-byte) corresponding to the operation, and of an evaluation computer for receiving the key code from the operation detecting module, recording the key code as log data and analyzing the data.

For evaluation by the usability evaluation device, to begin with, the operation detecting module is attached to an object device (which may be defined herein either hardwarewise or softwarewise) to be evaluated, or alternatively, the operation detecting module is installed into the object device. The evaluation object device is exemplified such as a product for providing a function to the user in response to the user's operation, a hardware model of this type of product, GUI (Graphical User Interface) on a computer, or a Web page browsed through Browser, and so on.

As for the product and the hardware model of the product, the operation detecting module is attached to a switch unit of the product. The operation detecting module is exemplified such as a contact switch for detecting that the user presses a push button, an area sensor for detecting a user's operation upon a predetermined area, a touch panel and so forth.

One of these operation detecting modules may be connected directly to an input port of the evaluation computer. In this case, a driver program on the evaluation computer converts a signal from the operation detecting module into a predetermined key code.

Further, one of those operation detecting modules may also be connected to a computer dedicated to the detection, whereby the key code may be generated. In this case, the key code generated may be transferred to the evaluation computer from the computer dedicated to the detection.

Moreover, for example, if the object device is operated through infrared-ray communications by a remote controller, the operation detecting module is a signal converting device for receiving and converting infrared-rays from the remote controller into a key code (a predetermined bit-pattern) corresponding thereto and inputting the key code to the evaluation computer.

Furthermore, if the object device is a computer including the GUI, the operation detecting module is a pseudo program of simulation for capturing an event from the GUI and outputting a key code corresponding to this event. This type of pseudo program is defined corresponding to, for instance, GUI buttons and control and may be executed as replaced with functions (callback routine).

Still further, if the evaluation object is a Web page, the operation detecting module is a dedicated piece of Browser for generating a key code when, for example, a button and a link of the Web page are manipulated. After the operation detecting module described above has been installed into the object device or the object computer, the examinee operates the object device. The key code corresponding to the element manipulated is thereby generated, whereby the object device is to be evaluated.

For evaluating the object device, information (test procedures) for evaluation is preset in the evaluation computer. The evaluation information is, e.g., attribute information (a distinction of sex, an age, a using experience, etc.) of the examinee, an evaluation object (information such as a name of a test machine, etc.), correctness information serving as a criterion for evaluation, and so on.

Herein, the correctness information is a series of operation steps on the object device. These operation steps are exemplified such as setting a temperature of a car air-conditioner at 20 degrees, setting a CD track to No.5, subsequently opening a window of a rear seat, and so forth. These test procedures may, however, be predetermined, and, after acquiring the log data, the correctness information may be set in the evaluation computer when analyzing the log data.

Obtained next are the log data when the examinee performs the operation in accordance with the test procedures. The log data can be obtained from the key code generated by the operation detecting module and time (corresponding to operation time) when each key code is generated.

The evaluation computer analyzes and organizes the obtained log data into a graph. At this time, there are executed a comparison between a general user and a well-experienced user, a comparison between a group of the examinees having the predetermined attributes and a group of other types of examinees, and so forth.

<System Structure>

FIG. 2 is the view showing an structure in which a usability evaluation device 11 in the embodiment of the present invention is combined with a hardware model 10 in order to evaluate the usability of the hardware model 10 of a car, an ATM, a cellular phone and so forth. As shown in FIG. 2, the usability evaluation device 11 includes a CPU 1 for controlling the device, a sensor 2 (corresponding to an operation detecting module) connected to an I/O port of the CPU 1 and generating operation signals when the user manipulates switches of the hardware model 10, a hard disk device 3 for recording the user's operation taken in from the sensor 2, a display device 4 for displaying a result of the evaluation, a keyboard 5, a video camera 6 for capturing an operation image of the user's operation, a VTR 7 for recording the captured operation image, and an image display device 8 for displaying the recorded image.

The sensor 2 is the contact switch provided in superposition on the push button 12 of the hardware model, the infrared-ray area sensor for detecting intrusion of the hand and the fingers into the predetermined area, and so on. When the examinee presses the push button, the contact switch detects this pressing operation. Further, when the examinee moves his or her hand in close proximity to the switch in a predetermined position, the area sensor detects the intrusion of the hand. The sensor 2 generates a detection signal of the operation described above, and transmits the detection signal to the CPU 1 via the I/O port.

The CPU 1 executes a control program 1b retained on an unillustrated memory, thereby controlling the device. Further, the CPU 1 converts an address of the I/O port or a position signal from the area sensor into a key code corresponding thereto.

Moreover, the CPU 1 measures time when detecting each operation signal with the aide of a built-in timer 1a (corresponding to a completion time measuring unit). The control program 1b executed by the CPU 1 stores a result of these measurements (types of the detected operations, and detection time of each of the operations) as pieces of log data (which are written as collected data 3 in FIG. 2).

Further, the CPU 1 separately executes an analysis program, thereby analyzing and evaluating the collected log data. Then, the analysis program has a result of the evaluation displayed the display device 4.

The video camera 6 captures an image of the user's operation upon the object system. The VTR 7 records the image captured by the video camera 6.

The image display device 8 displays the image, of how the user operates the object system, which image has been recorded by the VTR 7. This image, though not used directly for the evaluation in the present usability evaluation device, is supplementally utilized for verifying validity of the result of the evaluation and for adding a subjective analysis to the result of the evaluation by the present usability evaluation device.

<Screen Layout>

Figure 3:
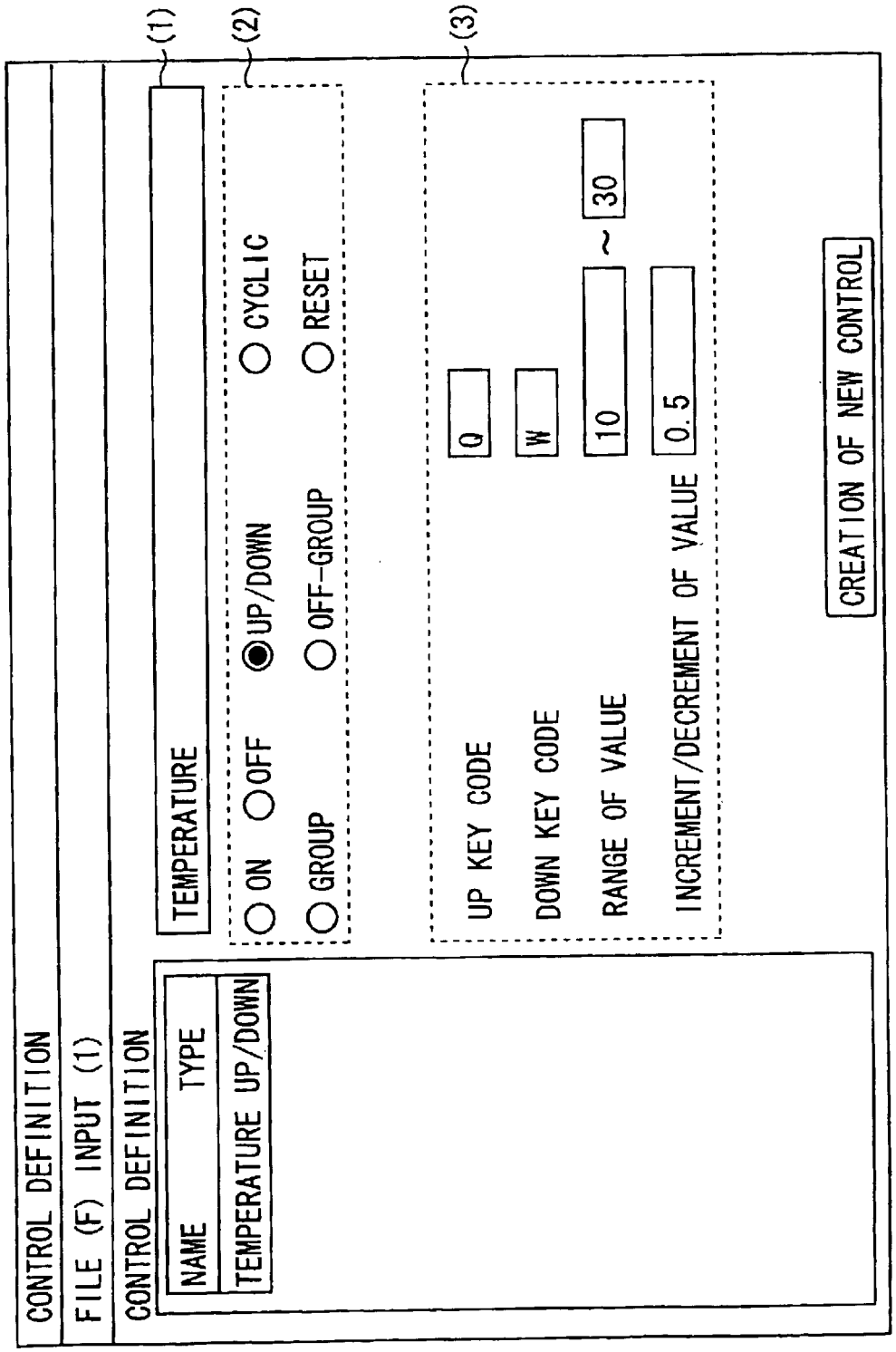
FIG. 3 shows an example of a control definition screen.

FIGS. 3 through 7 show the examples of the definition screen for defining the various categories of information in the present usability evaluation device. FIG. 3 shows the example of a control definition screen. On the control definition screen, there is defined a piece of information (this piece of information is called control) inputted from each of the operation units of the hardware model 10 to be evaluated.

On the control definition screen, there are set a name of the control ((1) in FIG. 3), a type of the control ((2) in FIG. 3) and a corresponding key code and data of every control ((3) in FIG. 3).

The name of the control is a name of a function of the operation unit concerned. For example, in the case of the operation unit for setting a temperature, a name [Temperature] is set.

The type of the control is a type of the switch structuring the operation unit. In the usability evaluation device according to the present embodiment, the following six types are provided.

(1) ON/OFF

This is a switch that is switched ON/OFF repeatedly each time this switch is pressed as a power source switch is. If the control type is ON/OFF, only a key code corresponding thereto is set, and other pieces of data are not defined.

(2) UP/DOWN

This is a switch in which a value is incremented or decremented each time the switch is pressed as in the case of setting the temperature. If the control type is UP/DOWN, as indicated by (3) in FIG. 3, a key code corresponding to UP, a key code corresponding to DOWN, a value range and an increment/decrement of the value are set as pieces of data. Note that the increment/decrement of the value is an increment quantity for the UP operation and a decrement quantity for the DOWN operation.

(3) CYCLIC

This is a switch in which each time one switch like a changeover switch of an air blow port of, e.g., the car air-conditioner is pressed, a status changes such as [Window]→[Front]→[Underfoot]→[Window]. If the control type is CYCLIC, only a key code corresponding the next status to be transited is set, and other pieces of data are not defined.

(4) GROUP

This is a switch in which to select such a single status that other switches are canceled when pressing one switch. If the control type is GROUP, a key code corresponding to each status is defined as the data.

(5) OFF-GROUP

This is, though similar to GROUP, a switch for allowing a state where none of the statuses are selected. If the control type is OFF-GROUP, key codes corresponding to the respective statuses and to the non-status case are likewise defined as the data.

(6) RESET

This is a switch for changing (for setting a RESET status) the statuses of other switches.

Figure 4:
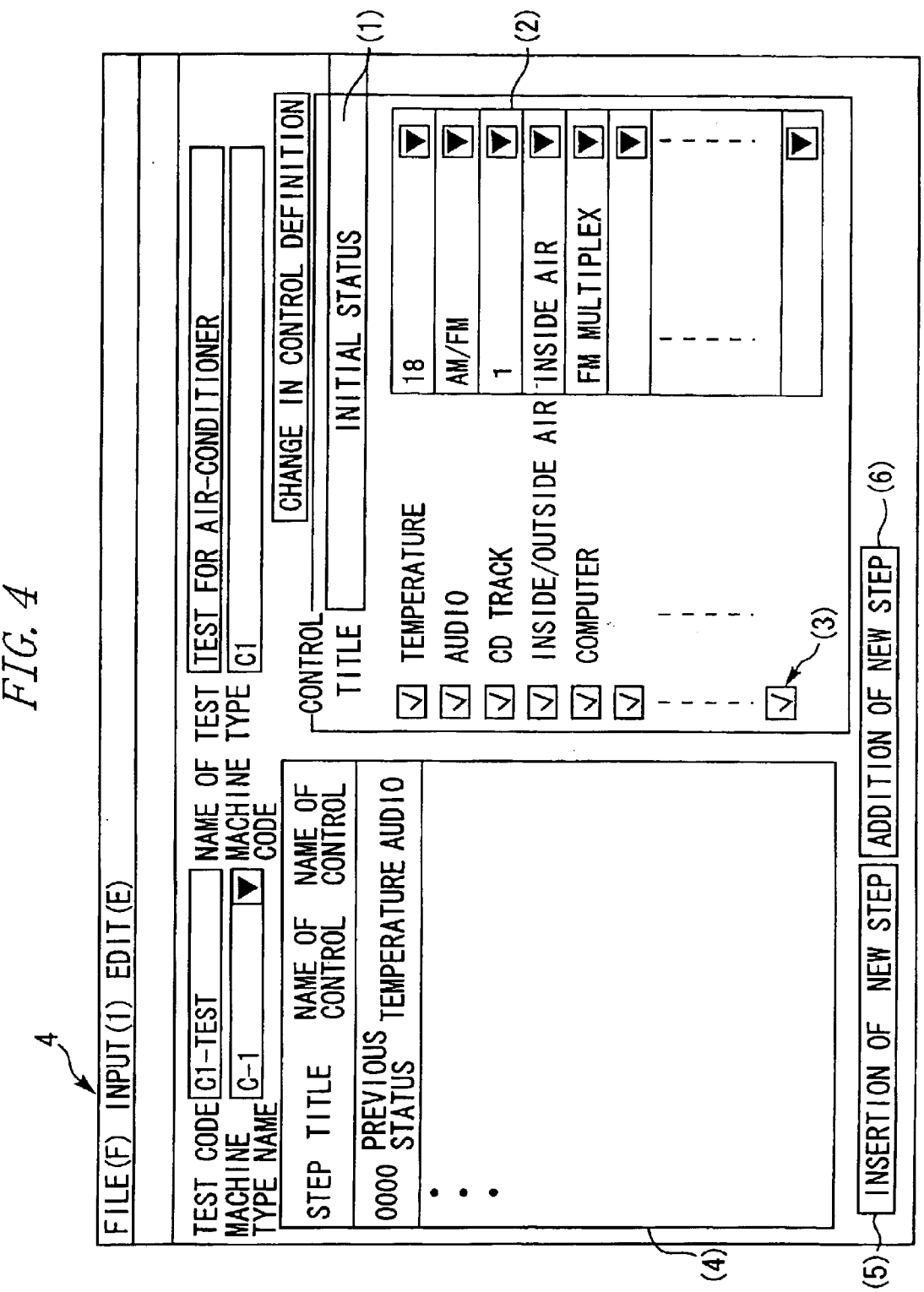
FIG. 4 shows an example of an operation step definition screen.

FIG. 4 shows the example of the definition screen for the operation steps. The usability evaluation device evaluates the device on the basis of a combination of one or more operation steps (the operation step may also be referred to as a task). The operation unit (control) operated in each operation step is defined on the operation step definition screen in FIG. 4.

As shown in FIG. 4, the operation step definition screen contains a title box ((1) in FIG. 4), status setting boxes ((2) in FIG. 4), operation selecting checkboxes ((3) in FIG. 4) and an operation step display box ((4) in FIG. 4).

A name of the operation step (task) defined at the present is designated in the title box. Herein, if the name of the operation step is an [initial status], the initial status of the device is defined.

One or more categories of the control operated in this operation step are designated in the operation selecting checkboxes ((3) in FIG. 4). In FIG. 4, for example, the control categories such as a "temperature", an "audio", a "CD track", an "inside/outside air", etc. are designated by checkmarks. Thus, in the usability evaluation device, the plurality of control categories can be designated for the single operation step.

Statuses that should be set in the present operation step for the respective control categories selected in the operation selecting checkboxes ((3) in FIG. 4), are specified in the status setting boxes ((2) in FIG. 4). For instance, 18 degrees is entered in the "temperature", AM/FM (a status to which the radio is tuned in) is entered in the "audio", 1 is entered in the "CD track", the inside air is entered in the "inside/outside air", and so forth.

Thus, after setting one operation step, a new operation step is added by pressing a "new step insertion button" ((5) in FIG. 4) or a "new step adding button" ((6) in FIG. 4), and the definitions in the title box ((1) in FIG. 4), the operation selecting checkboxes ((3) in FIG. 4) and the status setting boxes ((2) in FIG. 4), are repeated. A test sequence structured of a series of operation steps can be thereby defined.

This test sequence is stored as the correctness information on the hard disk device 3.

Figure 5:
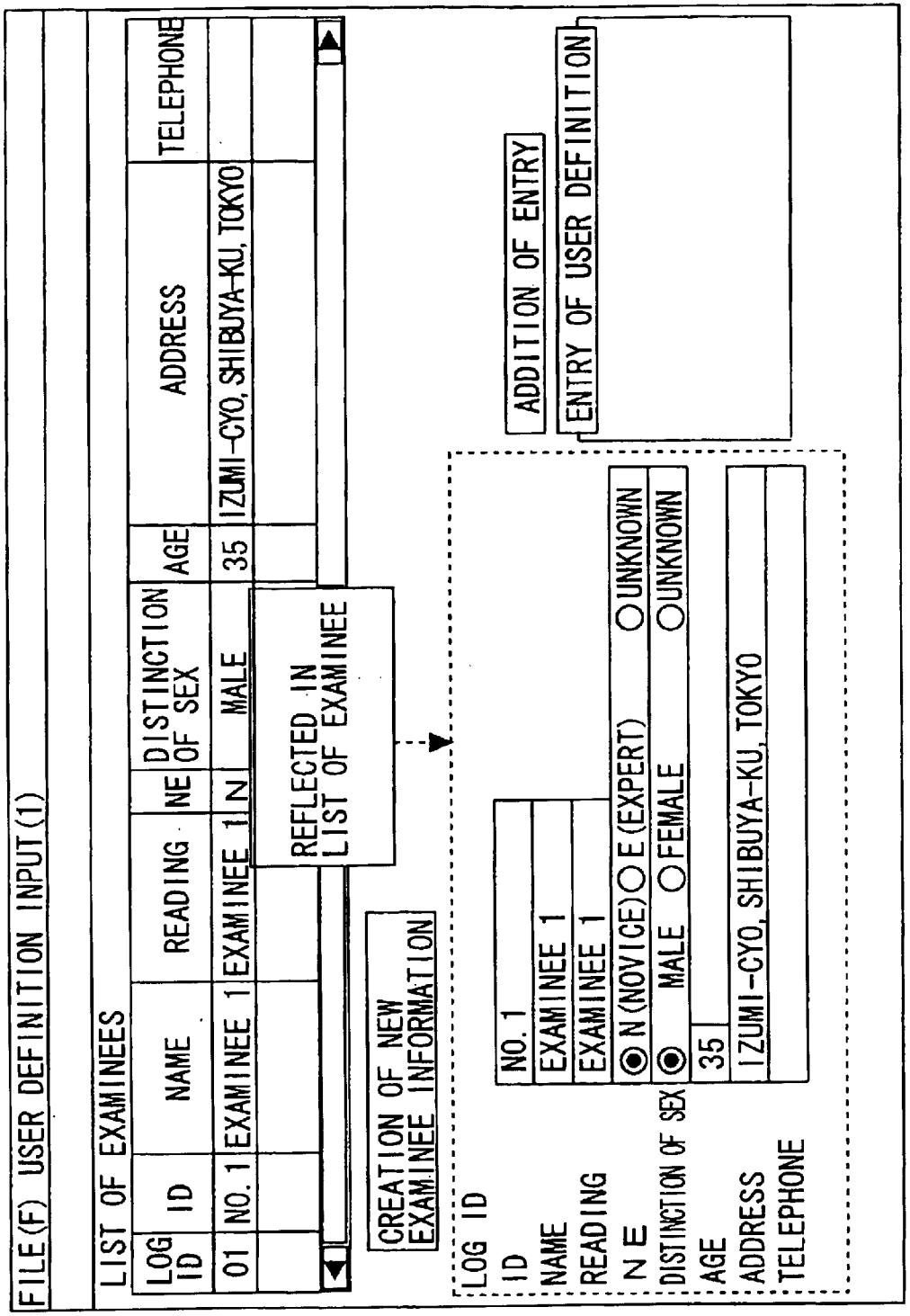
FIG. 5 shows an example of an examinee information definition screen.
Figure 7:
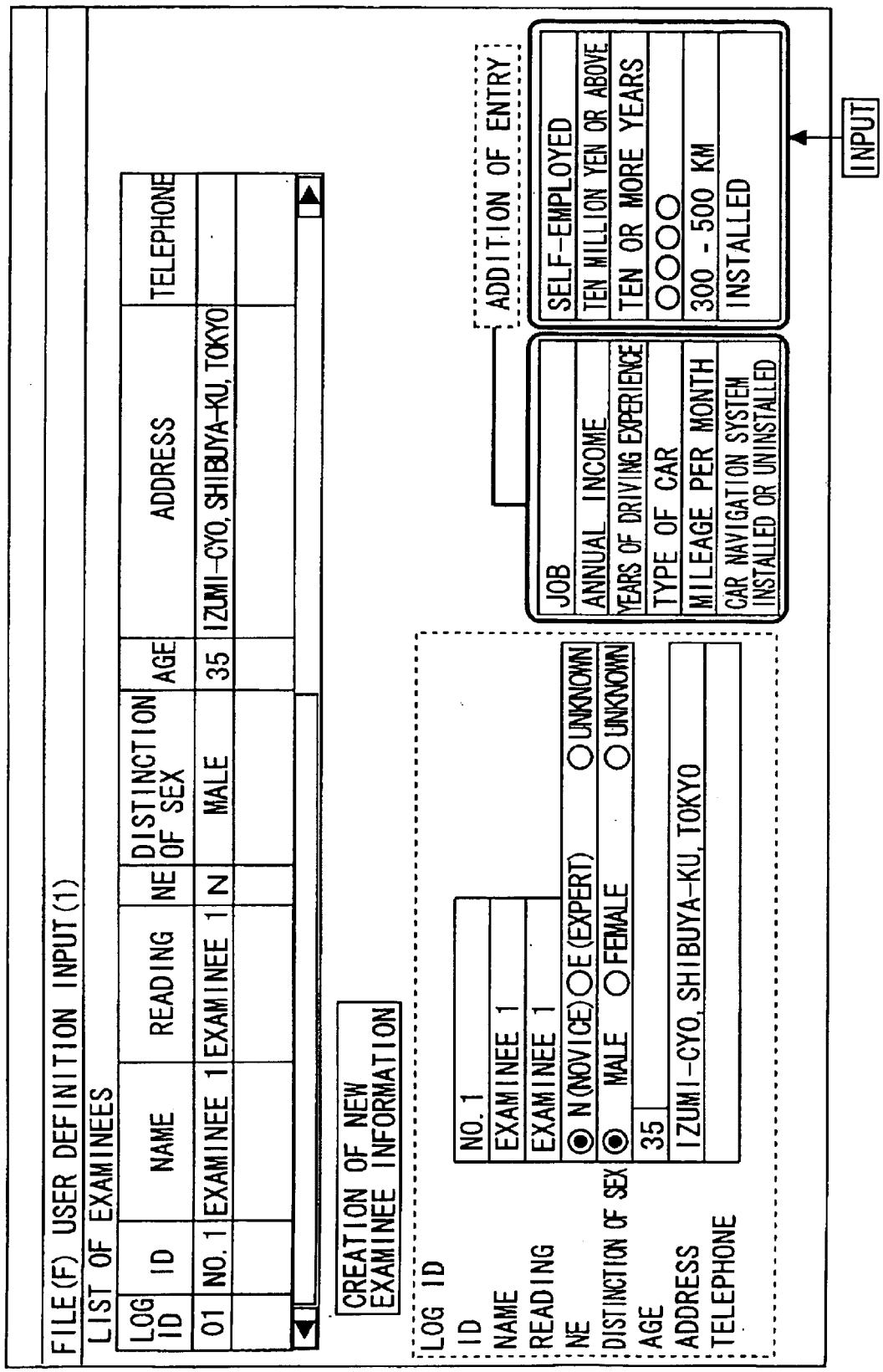
FIG. 7 shows an example of the examinee information definition screen.

FIGS. 5 through 7 show the examples of the examinee information definition screen on which the user's (examinee's) attributes are defined. In the usability evaluation device, as shown in FIG. 5, a "log ID", an "ID", a "name", "reading", "NE (a distinction between Novice and Expert), a "distinction of sex", an "address" and a "telephone number", are prepared as the examinee information.

Further, in the usability evaluation device, the user is able to define attributes other than the attributes prepared beforehand in the device. Namely, as shown in FIG. 6, the user may click an "entry adding button" ((1) in FIG. 6), then input a name of the entry ((2) in FIG. 6) and click an "OK button" ((3) in FIG. 6). FIG. 7 shows an example of the user definition entries. Added in FIG. 7 are entries such as a "job", an "annual income", "years of driving experience", "mileage per month", "possession or non-possession of car navigation system", and so on.

FIG. 8 shows an example of a log data display screen for displaying the obtained log data. As shown in FIG. 8, the log stored on the usability evaluation device consists of a "step", a "code (a simple notation of the key code), a "key name acquisition time" and respective control statuses (such as a "temperature", "audio", a "CD track", etc.).

For instance, in FIG. 8, after starting the test (which indicates a row where the start key is specified in the "key name"), a temperature setting operation specified by a key code Q is repeated, and it can be understood that the set temperature rises such as 18 degrees, 18.5 degrees, 19 degrees, 19.5 degrees and so forth.

FIGS. 9 and 10 show examples of performing a comparison and verification based on an attribute ratio among the examinees. The attribute ratio among the examinees is a ratio of measurement data among the examinees each having different attributes, wherein this ratio is obtained by performing a predetermined evaluation test repeatedly by a plurality of examinees each having the different attributes, and adding up logs when operated by the examinees exhibiting the same attributes. The measurement data is, for example, average time required for executing a predetermined operation step.

For instance, in FIG. 9, NE (the distinction between Novice and Expert) and the years of driving experience are selected as attributes. Then, in FIG. 10, logs of the examinees of a first group as Experts each having ten or more years of their driving experiences are added up and indicated by a solid line graph. Further, logs of the examinees of a second group as Novices each having three to five years of their driving experiences are added up and indicated by a dotted line graph. Moreover, a rate of the operation time in each operation step is indicated by a bar graph.

<Operation>

FIG. 11 shows a flowchart of a log data acquisition process in the usability evaluation device. This process is actualized by an application program executed by the CPU 1 of the usability evaluation device.

When starting up the log data acquisition process, the usability evaluation device, at first, receives the key code (S1). Then, the usability evaluation device reads the key code and refers to the definition of the control defined corresponding to this key code (see FIG. 3), thereby judging a type of the operation switch.

Subsequently, the usability evaluation device judges whether the type of the operation switch is ON/OFF or not (S2). If the type of the operation switch corresponding to the key code is ON/OFF, the usability evaluation device replaces and sets the status (ON/OFF) of the control that corresponds to the key code, and outputs the control status to the log (S3). Thereafter, the usability evaluation device returns the control to S1.

Further, whereas if the type of the operation switch corresponding to the key code is not ON/OFF, the usability evaluation device judges whether the type of the operation switch is UP/DOWN or not (S4). If the type of the operation switch corresponding to the key code is UP/DOWN, the usability evaluation device reads an increment/decrement value corresponding to this key code from the control definition. Then, the usability evaluation device adds the increment/decrement value to the present control value in the case of UP and, in the case of DOWN, subtracts the increment/decrement value therefrom, and outputs a result to the log (which is described as integrating in S5 in FIG. 11). Thereafter, the usability evaluation device returns the control S1.

Moreover, whereas if the type of the operation switch corresponding to the key code is not UP/DOWN, the usability evaluation device judges whether the type of the operation switch is CYCLIC or not (S6). If the type of the operation switch corresponding to the key code is CYCLIC, the usability evaluation device advances the control status corresponding to the key code to a next status, and outputs this next status to the log (S7). Thereafter, the usability evaluation device returns the control to S1.

Further, whereas if the type of the operation switch corresponding to the key code is not CYCLIC, the usability evaluation device judges whether or not the type of the operation switch is GROUP or OFF-GROUP (S8). If the type of the operation switch corresponding to the key code is GROUP or OFF-GROUP, the usability evaluation device reads a status corresponding to the key code from the control definitions, and outputs this status to the log (S9). Thereafter, the usability evaluation device returns the control to S1.

Furthermore, if the type of the operation switch corresponding to the key code is neither GROUP nor OFF-GROUP, the usability evaluation device judges whether the type of the operation switch is RESET or not (SA). If the type of the operation corresponding to the key code is RESET, the usability evaluation device resets a value of the control corresponding to the key code, and outputs a result of resetting to the log (SB). Thereafter, the usability evaluation device returns the control to S1.

Moreover, whereas if the type of the operation switch corresponding to the key code is not RESET, the usability evaluation device judges whether the log data acquisition process is ended or not (SC). If the end of the log data acquisition process is designated, the usability evaluation device terminates the process. Further, whereas if the end of the log data acquisition process is not designated, the usability evaluation device returns the control to S1.

Note that the judgment of whether the log data acquisition process is ended or not, is made also by monitoring whether an end button of an unillustrated log data acquisition window is pressed or not, independently of the processing flow in FIG. 11.

FIG. 12 shows a flowchart of a log data analyzing process. In this process, the usability evaluation device, to start with, reads information of a next step from the correctness information (which is set in FIG. 4) (S20).

Next, the usability evaluation device reads a next record of the log (S21). Then, the usability evaluation device executes a correctness judging process. Subsequently, the usability evaluation device judges whether a result of the correctness judging process is correct or not (S22, S23).

If the result of the correctness judging process is correct, the usability evaluation device calculates elapsed time till the present step is completed, and records the calculated time in an analysis result of the operation time (S25).

Next, the usability evaluation device judges whether or not a next step is defined in the correctness information (S26). If the next step exists in the correctness information, the usability evaluation device returns the control to S20, and starts analyzing the next step.

Further, whereas if the next step does not exist in the correctness information, this implies that all the operation steps have been finished, and hence the usability evaluation device displays a graph of the analysis result (S27). Thereafter, the usability evaluation device terminates the process in accordance with, e.g., an instruction of the operator.

While on the other hand, if the result of the correctness judging process is incorrect, the usability evaluation device judges whether or not the log contains a next record (S24). If the log contains the next record, the usability evaluation device returns the control to S21.

Furthermore, whereas if the log does not contain the next record, the usability evaluation device advances the control to S27 (S27). A graph is thereby displayed in a status where all the operations are not yet completed.

Note that when displaying the graph in S27, for example, data of an examinee having a specified attribute 1 (for instance, 10 or longer years of driving experience of the car) and data of an examinee having a specified attribute 2 (for example, 3 to 5 years of driving experience of the car), are respectively added up, and a ratio between the respective added results (between, e.g., average values of the operation time of the individual steps) may also be displayed.

FIG. 13 shows details of the correctness judging process (S22 in FIG. 12). In this process, the usability evaluation device compares a status in the present record of the log with a status in the present step of the correctness information (S221). Then, the usability evaluation device judges whether or not the status in the present record of the log is coincident with the status in the present step of the correctness information (S222).

If these statuses are coincident with each other, the usability evaluation device judges whether or not correct judgment time elapses after those statuses have become coincident (S223). Here, the correct judgment time is a predetermined period of time during which the correctness information is confirmed to be continuously coincident with the log in the comparison between the correctness information and the log.

If the correct judgment time elapses, the usability evaluation device makes a judgment of being correct, and sets a result of this judgment (S224). Thereafter, the usability evaluation device terminates the correctness judging process.

While on the other hand, if judged to be uncoincident in S222, or if the correct judgment time does not elapse in S223, the usability evaluation device clears the result of the correctness judgment (S225). Thereafter, the usability evaluation device finishes the process.

<Effects of Embodiment>

As discussed above, according to the usability evaluation device in the embodiment, the operator desiring to evaluate the usability of the device can organize the operation steps of the desired usability evaluation as the operator intends by setting the correctness information on the screen in FIG. 4. It is therefore possible to flexibly evaluate the usability of the device including, e.g., a variety of operation appliances such as audio products and so on as the car, etc. has.

Moreover, according to the present usability evaluation device, when the correctness information is continuously coincident with the log during the predetermined period of time in the comparison between the correctness information and the log (the result of the examinee's operation), it is judged that these two elements become coincident. Hence, even in the case of a mis-operation of exceeding the target set value in setting, e.g., a volume or the UP/DOWN switch, etc., a misjudgment of being correct can be avoided, and it is feasible to judge the coincidence of the correctness information with the log more surely.

Moreover, the present usability evaluation device is capable of not simply comparing the well-experienced user with the examinee (the general user) other than the well-experienced user but adding up and comparing the results of the operations on the basis of the variety of attributes of the examinees.

<Modified Examples>

In the embodiment discussed above, the data temporarily stored as the log in the log data acquisition process are analyzed in the log data analyzing process. As a substitute for this, however, the received key code is directly analyzed in parallel with the log data acquisition process, and the correctness judgment may also be made.

In the embodiment discussed above, the key code is temporarily generated based on the detection signal outputted by the sensor 2, and the operation of the user is identified from the key code and the control definition. The embodiment of the present invention is not, however, limited to these procedures. For example, the operation (the switch, etc. to be operated) of the examinee may be identified directly from an address, etc. of an input port to which the detection signal is inputted without generating the key code.

Further, in the embodiment discussed above, the control corresponding to the key code is identified, and the change in the control status is recorded in the log data. The embodiment of the present invention is not, however, confined to these procedures.

For example, the key code and the key code generation time may be recorded intactly in the log data. Then, when analyzing the log data, the control corresponding to the key code may be obtained. Namely, in the embodiment of the present invention, the operation of the examinee and the operation time thereof may finally be identified. Accordingly, as far as those final results are to be acquired, in recording in the in-process log or in analyzing the log, there may be implemented such a procedure change as to shift the process that is on the execution on one side to the other side.

INDUSTRIAL APPLICABILITY

The present invention can be applied to the usability evaluations of the devices for providing the functions by the operation of the user, such as information appliances, electric products, cars, ships, airplanes, machine tools, communication appliances, etc.

What is claimed is:

1. An evaluation device for evaluating usability of an object device on the basis of an operation by an examinee upon the object device, comprising:

means for defining an initial status of the object device;

means for defining a target status after operating the object device;

operation identifying means for identifying an examinee's operation upon the object device;

status identifying means for identifying an operation status of the object device by the examinee's operation;

judging means for judging whether the operation status is coincident with the target status or not;

time measuring means for measuring elapsed time required for the operation status to reach the target status from the initial status;

means for registering attributes of the examinee operating the object device;

means for adding up the elapsed time for every attribute of the examinee; and means for calculating a ratio of an added-up result about examinees having a first attribute to an added-up result about examinees having a second attribute.

2. An evaluation device according to claim 1, wherein the target status contains a plurality of transition statuses, said judging means sequentially judges whether the operation status is coincident with each of the plurality of transition statuses, and said time measuring means measures each elapsed time required for each of the transition statuses to be reached.

3. An evaluation device according to claim 1, wherein said operation identifying means includes a detection unit for detecting the operation upon the object device, and a notifying unit for notifying of the detected operation.

4. An evaluation device according to claim 1, wherein said operation identifying means includes means for receiving a signal generated corresponding to the operation upon the object device, and said status identifying means identifies the operation status by referring to a signal definition part in which a change in the status of the object device that corresponds to the signal is defined.

5. An evaluation device according to claim 4, further comprising:

means for referring to time when receiving the signal; and means for recording the time when receiving the signal together with the operation status identified by the received signal.

6. An evaluation device according to claim 1, wherein said operation identifying means includes means for reading a recording part recorded with the signal generated corresponding to the operation upon the object device and with generation time of this signal, said status identifying means identifies the operation status by referring to said signal definition part in which the change in the status of the object device that corresponds to the signal is defined, and said time measuring means includes means for calculating the elapsed time on the basis of the generation time read from said recording part.

7. An evaluation device according to claim 1, wherein said judging means judges that the operation status is coincident with the target status when the operation status is continuously in the target status during a predetermined period.

8. An evaluation method of making a computer evaluate usability of an object device on the basis of an operation by an examinee upon the object device, comprising:

a step of receiving a definition of an initial status of the object device;

a step of receiving a definition of a target status after operating the object device;

an operation identifying step of identifying an examinee's operation upon the object device;

a status identifying step of identifying an operation status of the object device by the examinee's operation;

a judging step of judging whether the operation status is coincident with the target status or not;

a step of measuring elapsed time required for the operation status to reach the target status from the initial status;

a step of receiving registration of attributes of the examinee operating the object device;

a step of adding up the elapsed time for every attribute of the examinee; and a step of calculating a ratio of an added-up result about examinees having a first attribute to an added-up result about examinees having a second attribute.

9. A readable-by-computer recording medium recorded with a program for making a computer evaluate usability of an object device on the basis of an operation by an examinee upon the object device, comprising:

a step of receiving a definition of an initial status of the object device;

a step of receiving a definition of a target status after operating the object device;

an operation identifying step of identifying an examinee's operation upon the object device;

a status identifying step of identifying an operation status of the object device by the examinee's operation;

a judging step of judging whether the operation status is coincident with the target status or not;

a step of measuring elapsed time required for the operation status to reach the target status from the initial status;

a step of receiving registration of attributes of the examinee operating the object device;

a step of adding up the elapsed time for every attribute of the examinee; and a step of calculating a ratio of an added-up result about examinees having a first attribute to an added-up result about examinees having a second attribute.

10. A readable-by-computer recording medium recorded with a program according to claim 9, wherein the target status contains a plurality of transition statuses, said judging step includes a step of sequentially judging whether the operation status is coincident with each of the plurality of transition statuses, and said time measuring step includes a step of measuring each elapsed time for each of the transition statuses to be reached.

11. A readable-by-computer recording medium recorded with a program according to claim 9, wherein said operation identifying step includes a step of detecting the operation upon the object device, and a step of notifying of the detected operation.

12. A readable-by-computer recording medium recorded with a program according to claim 9, wherein said operation identifying step includes a step of receiving a signal generated corresponding to the operation upon the object device, and said status identifying step includes a step of referring to a signal definition part in which a change in the status of the object device that corresponds to the signal is defined, thereby identifying the operation status.

13. A readable-by-computer recording medium recorded with a program according to claim 12 further comprising:

a step of referring to time when receiving the signal; and a step of recording the time and the operation status identified by the signal received at the above time.

14. A readable-by-computer recording medium recorded with a program according to claim 9, wherein said operation identifying step includes a step of reading a recording part recorded with the signal generated corresponding to the operation upon the object device and with generation time of this signal, said status identifying step includes a step of referring to said signal definition part in which the change in the status of the object device that corresponds to the signal is defined, thereby identifying the operation status, and said time measuring step includes a step of calculating the elapsed time on the basis of the generation time read from said recording part.

15. A readable-by-computer recording medium recorded with a program according to claim 9, wherein said judging step involves judging that the operation status is coincident with the target status when the operation status is continuously in the target status during a predetermined period.

16. An evaluation device evaluating usability of an object device on the basis of an operation by an examinee upon the object device, comprising:

an initial status defining module defining an initial status of the object device;

a target status defining module defining a target status after operating the object device;

an operation identifying module identifying an examinee's operation upon the object device;

a status identifying module identifying an operation status of the object device by the examinee's operation;

a judging module judging whether the operation status is coincident with the target status or not;

a time measuring module measuring elapsed time required for the operation status to reach the target status from the initial status;

a registration module registering attributes of the examinee operating the object device;

an adding-up module adding up the elapsed time for every attribute of the examinee; and a calculation module calculating a ratio of an added-up result about examinees having a first attribute to an added-up result about examinees having a second attribute.

* * * * *